Oct. 1, 1963

C. V. BLUE 3,105,929

PERMANENTLY INSTALLED BATTERY CHARGING SYSTEM
FOR AUTOMOBILE SALES OR DISPLAY LOTS

Filed March 17, 1961

INVENTOR
Charles V. Blue
BY B. P. Fishburne, Jr.
ATTORNEY

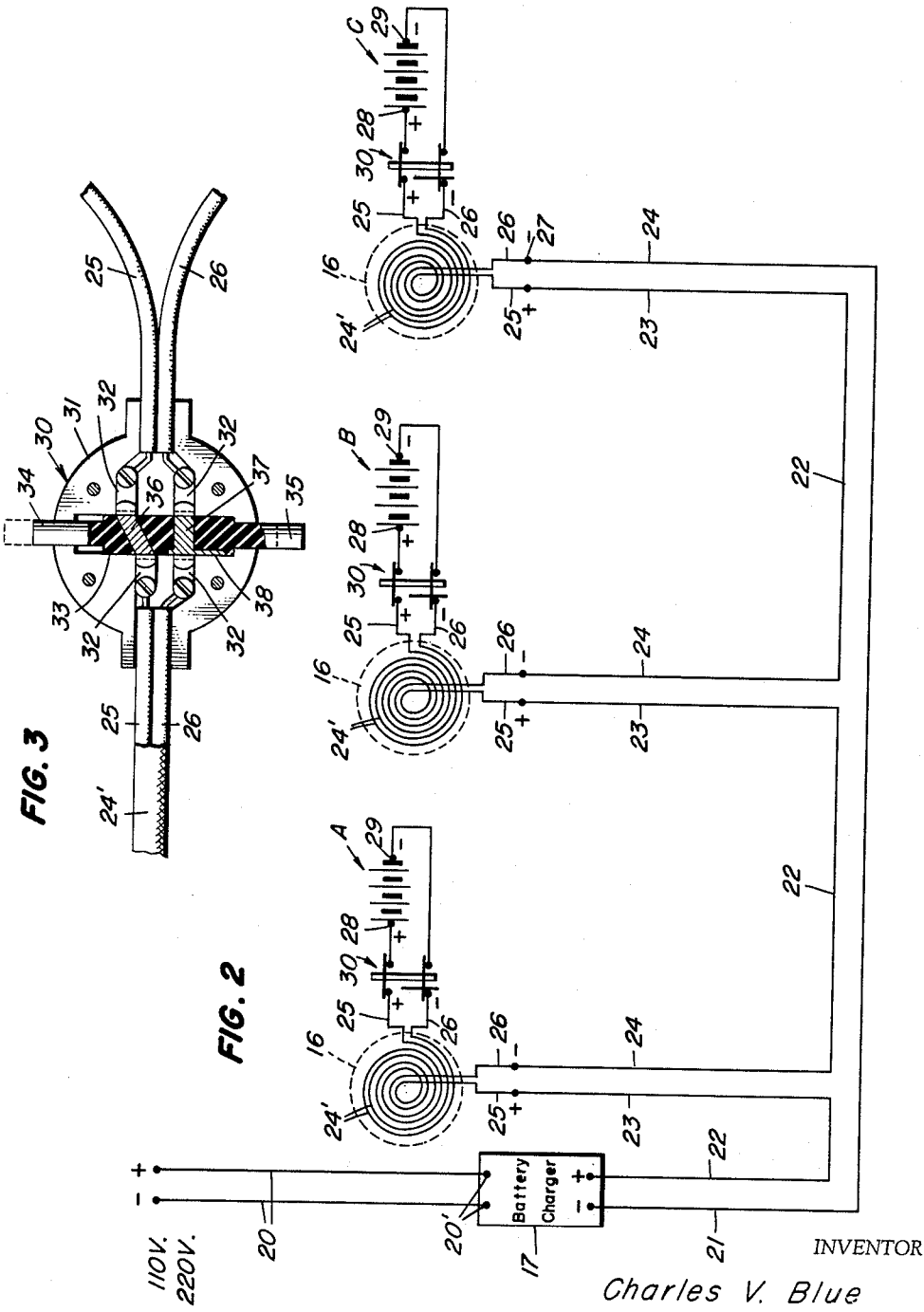

United States Patent Office 3,105,929
Patented Oct. 1, 1963

3,105,929
PERMANENTLY INSTALLED BATTERY CHARGING SYSTEM FOR AUTOMOBILE SALES OR DISPLAY LOTS
Charles V. Blue, 698 S. Main St., Crestview, Fla.
Filed Mar. 17, 1961, Ser. No. 96,469
4 Claims. (Cl. 320—2)

The present invention relates to means for charging storage batteries and the like.

A primary object of the invention is to provide a storage battery charging system which may be permanently installed on display lots of automobile dealers and the like, to facilitate the simultaneous charging of a number of automobile batteries, without the necessity of removing the batteries from the cars or re-arranging the cars on the lot.

Another object of the invention is to provide battery charging means of the mentioned character which may be installed underground or overhead in conjunction with the usual illumination system for the automobile display lot, such as a new car or used car lot.

Another object is to provide a battery charging installation of permanent character which does not interfere in the slightest with the normal usage of the lot, and the use of which installation will effect a considerable saving of time and labor and will extend the life of the automobile batteries and render it practical to maintain all of the batteries sufficiently charged at all times.

A further object is to provide a battery charging installation of the mentioned character which does away with the necessity of portable battery charging equipment on the display lot, the installation including a single stationary battery charger mounted in a convenient location, and a plurality of spaced interconnected take-up reels for wire leads which may be drawn outwardly for direct electrical connection with the terminals of the automobile storage batteries while the latter remain in place in the automobile.

Other objects and advantages of the invention will become apparent during the course of the following detailed description.

In the accompanying drawings forming a part of the application and in which like numerals are employed to designate like parts throughout the same, FIGURE 1 is a side elevation, partly schematic, of a battery charging installation according to the invention.

FIGURE 2 is an electrical wiring diagram or schematic of the charger system.

FIGURE 3 is an enlarged cross sectional view, partly schematic, of a switch embodied in the invention.

Figure 1:
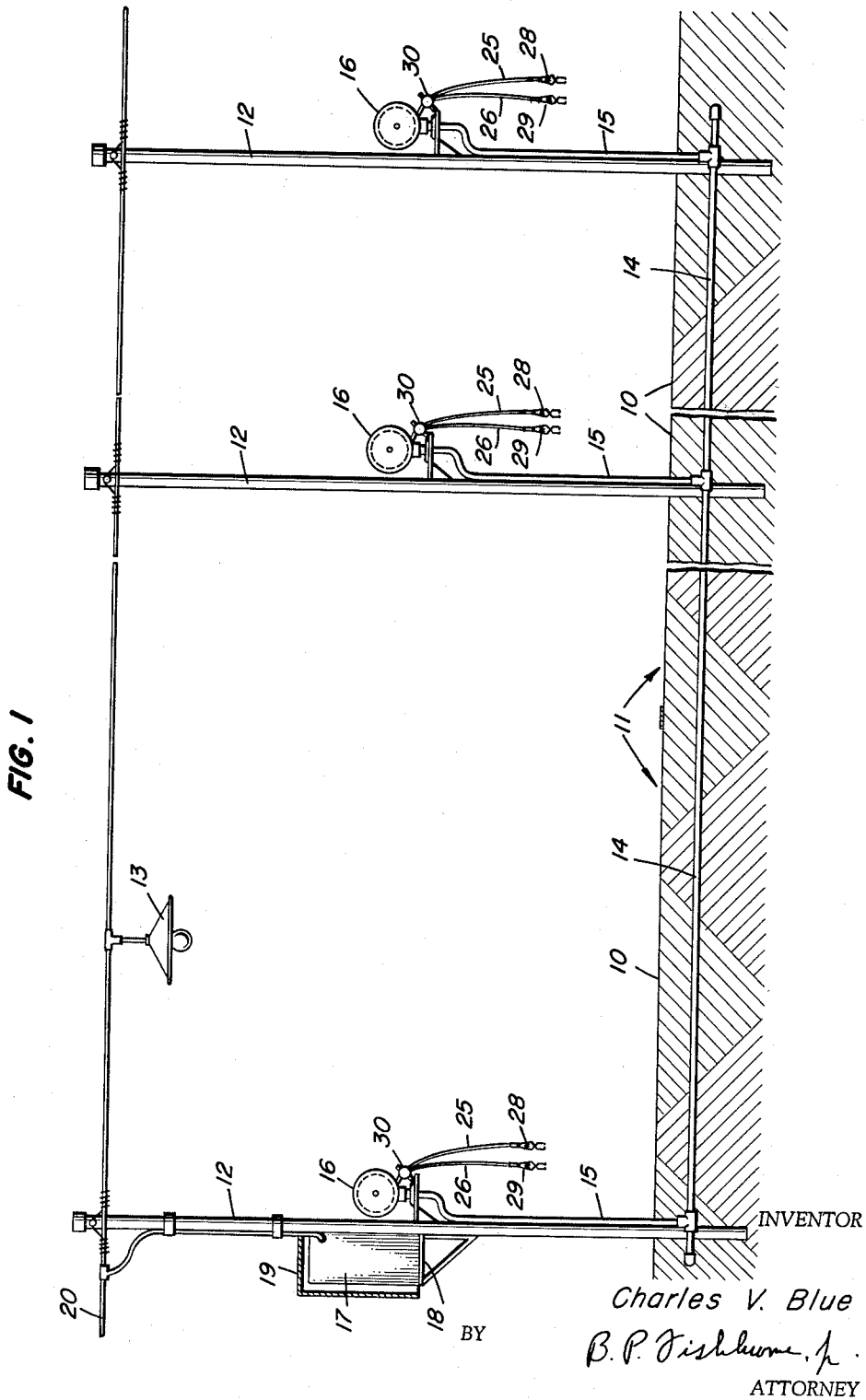

In the drawings, wherein for the purpose of illustration is shown a preferred embodiment of the invention, the numeral 10 designates the ground level or pavement of an automobile display lot having a plurality of car parking spaces 11 arranged in any desired manner, preferably in a row. Arranged preferably adjacent one side of the lot 10 are a number of spaced upstanding poles 12, normally used to support display lighting means 13 of a conventional character. The poles 12 may be conveniently located at the ends of the several parking spaces 11 along one edge of the lot, and the lot may be laid out in any desired manner, for example with rows of parking spaces on opposite sides thereof with an aisle or runway in the middle. The battery charging system according to the invention may be permanently installed along one side of the lot, and if necessary, a duplicate system may be installed along the opposite side of the lot. Obviously, variations in the arrangement and overall length of the system may be made in accordance with the size and dimensions of a particular display lot.

With continued reference to the drawings, the numeral 14 designates a preferably underground main electrical conduit of conventional construction, formed of corrosion-resistant metal, plastics material or the like. Upright branch conduits 15 lead from the underground conduit 14 at spaced intervals adjacent to the lighting posts 12 and secured to these posts in fixed relation by any suitable clamping means or the like, not shown. Swively secured to the top of each branch conduit 15 in direct communication therewith is a spring-operated take-up reel 16 for electrical cable means to be described. The reels 16 may be standard or conventional in construction and such reels are well known in the art and need not be described herein in detail. The spring operated take-up reels 16 are adapted to swivel or turn horizontally a full 360 degrees atop the branch conduits 15.

Securely mounted on preferably one endmost post 12, as at the back of the lot 10, is a conventional heavy duty direct current producing battery charger 17 of the slow or trickle charger type, and including conventional adjusting and control means, not shown, all well known to those skilled in the art. The charger 17 may be seated upon a bracket 18, secured to the endmost post 12 at a convenient elevation above the ground as indicated. The charger 17 is preferably provided with a weather-proof cover or housing 19 which may have a convenient access door.

A standard alternating current service line 20 for supplying 110 volts or 220 volts A.C. leads from a suitable source to the endmost post 12 carrying the charger 17 and down such post to the input terminals 20' of the charger.

The negative output terminal of the charger 17 is electrically connected with a negative wire 21 forming a part of the cable which extends within the underground conduit 14, with branches ascending through the branch conduits 15. The positive wire 22 of the cable within the conduits leads from and is electrically connected to the positive output terminal of the charger 17. Branch wires 23 and 24 lead from the wire 22 at points adjacent to the branch conduits 15 and through such branch conduits to the take-up reels 16. Each take-up reel has a two part wire or cable 24' wound upon its spool structure and the two wires of each cable 24' are indicated at 25 and 26 on the drawing. The wire 25 of each take-up reel cable 24' is electrically connected at the top of the adjacent branch conduit 15 with the branch cable wire 23. The wire 26 of each take-up reel cable is correspondingly electrically connected with the branch wire 24 in each branch cable. The main negative wire 21 leading from the charger 17 extends for the full length of the underground conduit 14, within the same, and terminates at 27, at the negative wire 26 of the endmost take-up reel cable 24' of the system, shown at the right hand ends of FIGURES 1 and 2.

The storage batteries A, B, C, etc. to be charged, have the usual positive and negative binding posts or terminals to be engaged by terminal clips 28 and 29 on the free ends of the wires 25 and 26. Instead of the clips 28 and 29, it is also contemplated to employ the well-known wedge type connectors which slide over correspondingly shaped terminal posts of the battery, whereby it is impossible to connect the battery terminals incorrectly to the lead wires 25 and 26. It may now be seen from the above description particularly with reference to FIGURE 2 that the several batteries A, B, C, etc. are adapted to be connected in series by the charging installation for simultaneous charging.

Means are provided in the circuit to isolate or short out any particular battery or batteries from the charging circuit while allowing other selected batteries to be charged as desired. Such means comprises in each take-up reel cable 24' a reciprocatory push button switch 30, bridging the cable wires 25 and 26 at the inner ends of the leads from these wires which carry the clips 28 and 29. With reference to FIGURE 3 showing one of the switches, the same comprises a body portion or housing 31 carrying stationary contacts 32, electrically connected with the wires 25 and 26. A reciprocatory switch actuator 33 having opposite push button extensions 34 and 35 carries bridging contacts 36 and 37 for establishing a series circuit through the associated storage battery when the switch is in the "on" position shown in full lines in FIGURE 3. When the actuator 33 is shifted to the "off" position shown dotted in FIGURE 3, the bridging contacts 36 and 37 disengage the stationary contacts 32 and interrupt the circuit through the wires 25 and 26 to the associated storage battery. An axial contact portion 38 of the movable contact 37 on the switch actuator 33 is adapted to bridge and electrically connect one pair of the fixed contacts 32 shown at the left hand side of FIGURE 3 when the actuator 33 is in the "off" position to short out the associated battery and allow the current to pass directly from the wire 25 to the wire 26 at one side of the switch remote from the battery thus maintaining the series connection in the main circuit while isolating the particular storage battery which it may be desired not to charge. The free lead wires carrying the clips 28 and 29 are unconnected or separated between the switch 30 and the adjacent battery so that the clips 28 and 29 may be readily secured to the battery terminals. On the other side of the switch 30, the wires 25 and 26 form the unitary two wire cable 24' which is wound up on and readily payed out from the particular take-up reel 16. I contemplate having about twelve feet of the cable 24' on each reel 16 which may be drawn outwardly the required distance in any direction due to the swiveled mounting of the reel 16 for attachment to the terminals of a car battery in one of the adjacent parking spaces 11. Variations in the length of the cable on each reel 16 are obviously possible within practical limits.

By virtue of this arrangement, it should now be obvious that the clips 28 and 29 of particular reel cables may be electrically connected with the battery terminals of selected automobile batteries on the lot, without removal of the batteries from their mountings or re-arrangement of the cars. The respective reels 16 are spaced along the lot in such a manner that the battery of any car on the lot along or near the installed battery charging system may be reached for charging by one of the cables 24' on an adjacent reel 16.

It has been described how a particular battery in the circuit may be bypassed by means of the switch 30. Of course, if it is desired not to connect the clips 28 and 29 of a particular reel cable to a battery and merely allow one reel cable to remain idle, the associated switch actuator 33 is merely placed in the "off" position and the circuit will be maintained through the wires 25 and 26 regardless of whether the clips 28 and 29 are secured to battery terminals or merely laid aside.

As previously stated, any reasonable number of the reels 16 and associated elements may be embodied within the installation dependent only upon the maximum capacity of the charger 17, and the installation is not limited to the three reels shown in the drawings for purpose of illustration. However, if the lot is extremely large with long rows of parked vehicles beyond the capacity of the single charger 17, the installation may be extended or duplicated by the provision of a second charger 17 and the other related components as shown in the drawings.

By means of the permanently installed charger system, as should now be obvious, a plurality of the automobile storage batteries may be placed on charge simultaneously, such as overnight while the charger 17 is in operation. If need be, a single battery only at a particular location on the lot may be charged at any time by means of the system, and just as efficiently as charging a number of batteries, by merely positioning the switches 30 of the inactive reels in the "off" or battery bypassing positions and utilizing the one reel cable with its switch in the "on" position. The installation is essentially a series circuit, simple in design and trouble-free after installation and requiring little or no maintenance, save for occasional maintenance or replacement of the charger unit 17. Once the system is permanently installed as shown in FIGURE 1 with the conduit 14 underground, most of the wiring is fully enclosed and protected from the elements by the conduits 14 and 15 and the reel casings. If preferred, the entire system may be physically reversed from its arrangement shown in FIGURE 1 and the conduit 14 may be mounted overhead on the poles 12 with the branch conduits 15 extending downwardly along the poles to the reels 16 which are mounted upon the poles for swiveling movement horizontally in all directions relative thereto.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. An electrical distribution system enabling the selective charging of multiple vehicle storage batteries on a display lot or the like without the necessity for removing the batteries from the vehicles or for moving the vehicles or for arranging portable battery charging equipment adjacent selected vehicles, said system comprising a single stationary direct current producing battery charger unit of the trickle charger type mounted at a convenient location on said lot with respect to said multiple vehicles, an input power line leading to and connected with said charger unit, an output cable of substantial length connected with said charger unit and extending along said lot in a direction whereby the cable will pass adjacent to a plurality of said vehicles, branch distribution cables connected with and extending laterally from said output cable at a plurality of points along the same, said branch cables including extensible and retractable coiled portions and reel means carrying such portions, support means for said reel means positioning the latter at a convenient location relative to said vehicles, free wire extensions on said branch cables forwardly of the reel means adapted for detachable connection with storage battery terminals of selected vehicles on said lot within an area capable of being spanned by said extensible and retractable branch cable portions, and a bypass switch electrically connected in each branch cable forwardly of the reel means thereof and operable in one adjusted position to complete a circuit through said free wire extensions and storage battery terminals and operable in a second adjusted position to short circuit said free wire extensions, whereby a selected number of said vehicle storage batteries may be simultaneously charged in series or a single such storage battery only may be charged.

2. An electrical distribution system for use in selectively charging vehicle storage batteries on a vehicle display lot or the like comprising a single stationary battery charger unit and means to supply power to said unit, a main distribution cable for direct current leading from said unit and extending adjacent to a number of said vehicles on said lot in spaced relation thereto, a plurality of spaced branch distribution cables extending from said main cable at spaced points along the latter, said branch cables including extensible and retractable coiled portions and reel means carrying such portions, support means for said reel means and having swiveled connection with the reel means so that the latter may turn substantially 360 degrees upon the support means, separated free wire extensions on said branch cables forwardly of the reel means, connector elements on the leading ends of said free wire extensions for detachable connection with storage battery terminals of selected vehicles on said lot within a region capable of being serviced by said extensible and retractable branch cable portions, and a two-position switch connected in each branch cable forwardly of the reel means and near the rear ends of said free wire extensions and operable for completing a circuit through said free wire extensions with said battery terminals or for short circuiting said free wire extensions, whereby a plurality of said vehicle batteries corresponding in number to said branch cables may be charged simultaneously or a lesser number of selected batteries may be charged simultaneously or a single battery only may be charged by said system.

3. The invention as defined by claim 2, and underground conduit means for said main distribution cable, aboveground generally upright conduit means for said branch cables, and a corresponding number of support posts for said aboveground conduit means and said support means for said reel means.

4. The invention as defined by claim 2, and wherein said connector elements on said free wire extensions are pinch clips engageable with the storage battery terminals.

References Cited in the file of this patent
UNITED STATES PATENTS

| | | |
|---|---|---|
| 297,924 | Gaulard et al. | Apr. 29, 1884 |
| 369,439 | Edison | Sept. 6, 1887 |
| 426,127 | Kintner | Apr. 22, 1890 |
| 2,980,842 | Medlar | Apr. 18, 1960 |

FOREIGN PATENTS

| | | |
|---|---|---|
| 60,061 | Netherlands | Oct. 15, 1947 |